(12) United States Patent
Ahn et al.

(10) Patent No.: US 9,799,453 B2
(45) Date of Patent: Oct. 24, 2017

(54) MULTILAYER CERAMIC CAPACITOR AND BOARD HAVING THE SAME

(71) Applicant: SAMSUNG ELECTRO-MECHANICS CO., LTD., Suwon-Si, Gyeonggi-Do (KR)

(72) Inventors: Young Ghyu Ahn, Suwon-Si (KR); Soon Ju Lee, Suwon-Si (KR); Sang Soo Park, Suwon-Si (KR); Heung Kil Park, Suwon-Si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 14/668,861

(22) Filed: Mar. 25, 2015

(65) Prior Publication Data
US 2016/0093441 A1 Mar. 31, 2016

(30) Foreign Application Priority Data
Sep. 29, 2014 (KR) .................. 10-2014-0130055

(51) Int. Cl.
| H01G 4/30 | (2006.01) |
| H01G 4/12 | (2006.01) |
| H01G 2/06 | (2006.01) |
| H01G 4/232 | (2006.01) |

(52) U.S. Cl.
CPC .............. *H01G 4/30* (2013.01); *H01G 2/065* (2013.01); *H01G 4/1227* (2013.01); *H01G 4/232* (2013.01)

(58) Field of Classification Search
CPC .. H05K 7/20; H01G 4/05; H01G 4/06; H01G 4/08; H01G 4/12; H01G 4/18; H01G 4/30; H01G 4/228; H01G 4/232; H01L 23/00; H01L 23/495; H01L 41/47
USPC .......... 174/260; 361/301.4, 303, 305, 306.1, 361/306.3, 308.1, 313, 434, 704, 772, 813
See application file for complete search history.

(56) References Cited

U.S. PATENT DOCUMENTS

| 5,923,072 A * | 7/1999 | Wada ................ H01L 21/28581 257/192 |
| 6,097,051 A * | 8/2000 | Torii ........................ H01L 28/55 257/295 |
| 6,104,129 A * | 8/2000 | Okamoto .............. H01L 41/293 310/366 |
| 6,159,660 A * | 12/2000 | Chen ........................ G03F 7/20 257/E21.027 |
| 6,284,595 B1 * | 9/2001 | Kato ........................ H01L 28/92 257/E21.02 |
| 6,304,425 B1 * | 10/2001 | Mamada ................ H05K 1/181 361/320 |

(Continued)

FOREIGN PATENT DOCUMENTS

KR 10-2010-0087622 A 8/2010

*Primary Examiner* — Xiaoliang Chen
(74) *Attorney, Agent, or Firm* — McDermott Will & Emery LLP

(57) ABSTRACT

A multilayer ceramic capacitor (MLCC) includes: first and second metal frames formed on a mounting surface of a ceramic body to be connected to first and second external electrodes providing voltages having opposing polarities, respectively, wherein the first and second metal frames are positioned inwardly of both end surfaces of the ceramic body in a length direction of the ceramic body to be spaced apart from both end surfaces of the ceramic body, respectively.

6 Claims, 4 Drawing Sheets

(56) References Cited

U.S. PATENT DOCUMENTS

| | | | | |
|---|---|---|---|---|
| 2001/0052466 A1* | 12/2001 | Horii | ............... | C25D 3/50 205/122 |
| 2009/0284896 A1* | 11/2009 | Sakaguchi | ............... | H01G 4/005 361/303 |
| 2009/0316329 A1* | 12/2009 | Nomura | ............... | H01G 4/236 361/301.1 |
| 2009/0316330 A1* | 12/2009 | Taniguchi | ............... | H01G 4/012 361/306.3 |
| 2010/0020467 A1* | 1/2010 | Yoon | ............... | H01G 4/224 361/305 |
| 2010/0096612 A1* | 4/2010 | Shim | ............... | H01L 45/144 257/4 |
| 2010/0123995 A1* | 5/2010 | Otsuka | ............... | H01G 2/06 361/308.1 |
| 2010/0128412 A1* | 5/2010 | Nishihara | ............... | H01G 4/30 361/306.3 |
| 2010/0188798 A1 | 7/2010 | Togashi et al. | | |
| 2010/0315870 A1* | 12/2010 | Abedifard | ............... | G11C 11/16 365/171 |
| 2012/0020025 A1* | 1/2012 | Sotome | ............... | H01G 2/08 361/704 |
| 2012/0074544 A1* | 3/2012 | Masuda | ............... | H01L 21/4832 257/673 |
| 2012/0236462 A1* | 9/2012 | Haruki | ............... | H01G 4/005 361/306.1 |
| 2012/0326569 A1* | 12/2012 | Itagaki | ............... | H01G 4/30 310/365 |
| 2014/0063687 A1* | 3/2014 | Saito | ............... | H01G 4/228 361/308.1 |
| 2014/0168851 A1* | 6/2014 | Lee | ............... | H01G 4/30 361/303 |
| 2014/0284091 A1* | 9/2014 | Fujii | ............... | H01G 4/30 174/260 |
| 2014/0376157 A1* | 12/2014 | Oh | ............... | H01G 2/04 361/434 |
| 2015/0021077 A1* | 1/2015 | Chae | ............... | H01G 4/30 174/260 |
| 2015/0114700 A1* | 4/2015 | Park | ............... | H01G 4/012 174/260 |
| 2015/0287670 A1* | 10/2015 | Fukase | ............... | H05K 1/186 361/772 |

* cited by examiner

MULTILAYER CERAMIC CAPACITOR AND BOARD HAVING THE SAME

CROSS-REFERENCE TO RELATED APPLICATION

This application claims the priority and benefit of Korean Patent Application No. 10-2014-0130055 filed on Sep. 29, 2014, with the Korean Intellectual Property Office, the disclosure of which is incorporated herein by reference.

BACKGROUND

The present inventive concept relates to a multilayer ceramic capacitor and a board having the same.

Capacitors, inductors, piezoelectric elements, varistors, thermistors, and the like, are representative electronic components using a ceramic material.

Among such ceramic electronic components, a multilayer ceramic capacitor (MLCC) is commonly used in a wide range of electronic apparatuses due to inherent advantages thereof, such as a relatively small size, relatively high capacitance, and an ease in the mounting thereof.

For example, such a multilayer ceramic capacitor may be used as a chip-type condenser mounted on the boards of various electronic products such as image display devices, including liquid crystal displays (LCDs), plasma display panels (PDPs), and the like, as well as computers, personal digital assistants (PDA), and mobile phones, serving to charge electricity therein or discharge electricity therefrom.

Such a multilayer ceramic capacitor may have a structure in which a plurality of dielectric layers and internal electrodes having opposing polarities are alternatingly disposed with respective dielectric layers alternatingly interposed therebetween.

In this case, since the dielectric layer has piezoelectric characteristics, when a direct current (DC) voltage or an alternating current (AC) voltage is applied to such a multilayer ceramic capacitor, a piezoelectric phenomenon may be generated between the internal electrodes, thereby generating periodic vibrations, while expanding and contracting a volume of a ceramic body according to the frequency of the voltage applied thereto.

These vibrations may be transferred to the board through external electrodes of the multilayer ceramic capacitor and solders connecting the external electrodes and the board to each other, such that the entire board is used as a sound reflecting surface generating vibrational sound, commonly known as noise.

Such vibrational sound may correspond to noise within an audio frequency range of 20 to 20,000 hertz (Hz), sound which may cause discomfort to listeners thereof. Vibrational sound causing listener discomfort, as described above, may be termed acoustic noise.

SUMMARY

An aspect of the present inventive concept may provide a multilayer ceramic capacitor (MLCC) having a reduced amount of acoustic noise.

According to an aspect in the present inventive concept, a multilayer ceramic capacitor may include: first and second metal frames formed on a mounting surface of a ceramic body to be connected to first and second external electrodes providing voltages having opposing polarities, respectively, wherein the first and second metal frames are positioned inwardly of both end surfaces of the ceramic body in a length direction of the ceramic body to be spaced apart from both end surfaces of the ceramic body in the length direction of the ceramic body, respectively.

BRIEF DESCRIPTION OF DRAWINGS

The above and other aspects, features and other advantages of the present inventive concept will be more clearly understood from the following detailed description taken in conjunction with the accompanying drawings, in which.

DETAILED DESCRIPTION

Figure 1:
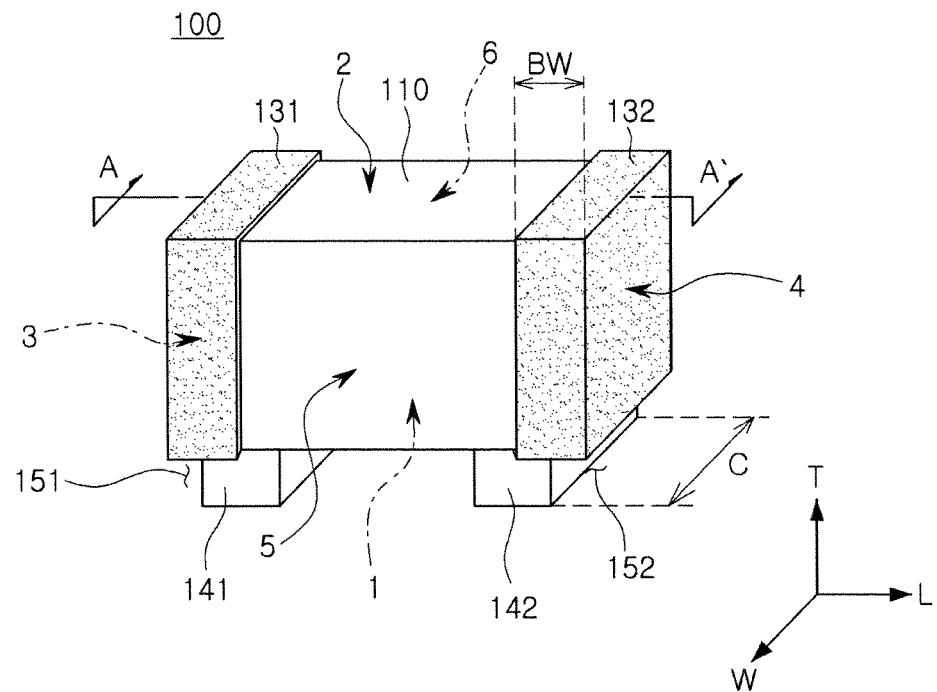
FIG. 1 is a perspective view schematically illustrating a multilayer ceramic capacitor (MLCC) according to an exemplary embodiment in the present inventive concept.

Exemplary embodiments in the present inventive concept will now be described in detail with reference to the accompanying drawings.

The inventive concept may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art.

In the drawings, the shapes and dimensions of elements may be exaggerated for clarity, and the same reference numerals will be used throughout to designate the same or like elements.

As used herein, it will be further understood that the terms "include" and/or "have" when used in the present inventive concept, specify the presence of elements, but do not preclude the presence or addition of one or more other elements, unless otherwise indicated.

Multilayer Ceramic Capacitor

Figure 2:
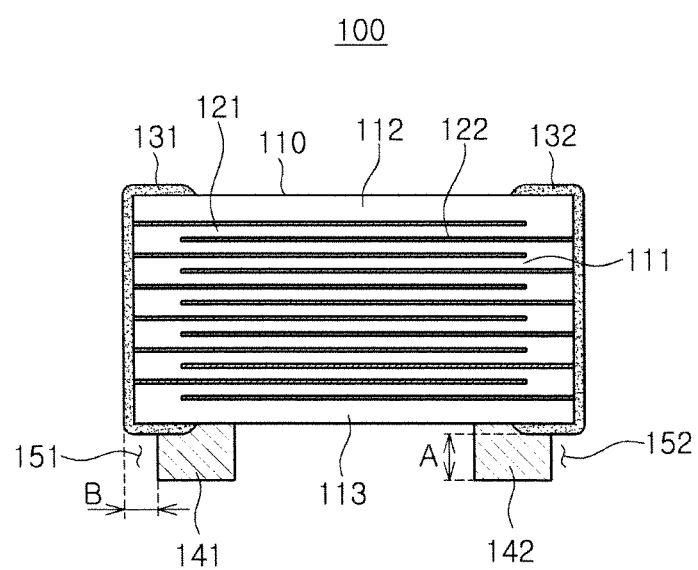
FIG. 2 is a cross-sectional view of FIG. 1 taken along line A-A'.

FIG. 1 is a perspective view schematically illustrating a multilayer ceramic capacitor (MLCC) according to an exemplary embodiment in the present inventive concept; and FIG. 2 is a cross-sectional view of FIG. 1 taken along line A-A'.

Referring to FIGS. 1 to 2, a multilayer ceramic capacitor 100 according to the present exemplary embodiment may include a ceramic body 110, first and second external electrodes 131 and 132, first and second internal electrodes 121 and 122, and first and second metal frames 141 and 142.

The ceramic body 110 may be formed by stacking a plurality of dielectric layers 111 in a thickness direction (T) of the ceramic body 110 and performing a sintering process thereon.

Here, adjacent dielectric layers 111 of the ceramic body 110 may be integrated with each other so that boundaries therebetween are indiscernible.

In addition, the ceramic body 110 may have a hexahedral shape. However, the shape of the ceramic body 110 is not limited thereto.

In the present exemplary embodiment, for ease of description, surfaces of the ceramic body 110 opposing each other in a thickness direction T of the ceramic body 110 in which the dielectric layers 111 of the ceramic body 110 are stacked are referred to as lower and upper surfaces 1 and 2 of the ceramic body 110, respectively, surfaces of the ceramic body 110 connecting the upper and lower surfaces and opposing each other in a length direction L of the ceramic body 110 are referred to as first and second end surfaces 3 and 4 of the ceramic body 110, respectively, and surfaces of the ceramic body 110 vertically intersecting the first and second end surfaces 3 and 4 and opposing each other in a width direction W of the ceramic body 110 are referred to as first and second side surfaces 5 and 6 of the ceramic body 110, respectively.

Meanwhile, the ceramic body 110 may have an upper cover layer 112 formed above an uppermost internal electrode and a lower cover layer 113 formed below a lowermost internal electrode, wherein the upper cover layer 112 has a predetermined thickness.

Here, the upper and lower cover layers 112 and 113 may be formed of the same composition as that of the dielectric layer 111, and may be formed by stacking at least one dielectric layer not including the internal electrodes above the uppermost internal electrode and below the lowermost internal electrode of the ceramic body 110.

The dielectric layer 111 may contain a high-k ceramic material, for example, barium titanate ($BaTiO_3$) based ceramic powder, or the like. However, the type of material contained in the dielectric layer 111 is not limited thereto.

An example of the $BaTiO_3$-based ceramic powder may have $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, in which calcium (Ca), zirconium (Zr), or the like, is partially dissolved in $BaTiO_3$. However, the example of the $BaTiO_3$-based ceramic powder is not limited thereto.

In addition, the dielectric layer 111 may further include at least one of a ceramic additive, an organic solvent, a plasticizer, a binder, and a dispersant.

As the ceramic additive, for example, a transition metal oxide or carbide, a rare earth element, magnesium (Mg), aluminum (Al), or the like, may be used.

The first and second external electrodes 131 and 132 may be disposed in both end portions of the ceramic body 110 in a length direction of the ceramic body 110, and as necessary, may be extended from the first and second end surfaces 3 and 4 of the ceramic body 110 onto portions of the lower and upper surfaces 1 and 2 of the ceramic body 110, respectively, or portions of the first and second side surfaces of the ceramic body 110, respectively.

Here, the first and second external electrodes 131 and 132 may be formed in both end portions of the ceramic body 110, respectively, by applying a conductive paste containing a conductive metal and performing a sintering process thereon.

The conductive metal may be nickel (Ni), copper (Cu), palladium (Pd), or an alloy thereof.

Meanwhile, the first and second external electrodes 131 and 132 may have respective plating layers formed thereon by performing a plating process on surfaces of the first and second external electrodes 131 and 132, as necessary.

The plating layers may include Ni plating layers formed by plating Ni on the first and second external electrodes 131 and 132, respectively, and tin plating layers formed by plating tin (Sn) on the Ni plating layers, respectively.

The first and second internal electrodes 121 and 122 may be sequentially disposed in the thickness direction T of the ceramic body 110 one at a time, with each of the dielectric layers 111 interposed therebetween.

In this case, the first and second internal electrodes 121 and 122 may be electrically insulated from each other by the dielectric layer 111 disposed therebetween.

Here, the first and second internal electrode layers 121 and 122 may be formed by printing first and second internal electrode patterns on respective ceramic green sheets forming the dielectric layers 111, using the conductive paste including the conductive metal by a screen printing scheme or a gravure printing scheme, alternatingly stacking the ceramic green sheets on which the internal electrode patterns are printed in the thickness direction T of the ceramic body 110, with each of the dielectric layers 111 interposed therebetween, and performing a sintering process thereon.

The conductive metal may be Ni, Cu, Pd, or an alloy thereof. However, the type of conductive metal is not limited thereto.

In addition, the first and second internal electrodes 121 and 122 may be exposed through the first and second end surfaces 3 and 4 of the ceramic body 110, respectively, and may be connected to the first and second external electrodes 131 and 132 to which voltages having opposing polarities are applied, respectively.

According to the configuration as described above, when voltages are applied to the first and second external electrodes 131 and 132, electric charges may be accumulated between the first and second internal electrodes 121 and 122 facing each other.

Here, a level of capacitance of the multilayer ceramic capacitor 100 may be in proportion to an overlapping area of the first and second internal electrodes 121 and 122 in the direction T in which the first and second internal electrodes 121 and 122 are stacked.

The first and second metal frames 141 and 142 may be disposed on the lower surface 1 of the ceramic body 110 which is a mounting surface of the ceramic body 110 to be connected to the first and second external electrodes 131 and 132, respectively.

When the multilayer ceramic capacitor 100 is mounted on a circuit board, or the like, the first and second metal frames 141 and 142 may secure a predetermined interval between the multilayer ceramic capacitor 100 and the circuit board in order to avoid direct contacts between the first and second external electrodes 131 and 132 and solders, and directly block a portion of vibrations transferred through the first and second external electrodes 131 and 132 of the multilayer ceramic capacitor 100, such that an amount of acoustic noise may be reduced.

Here, the first and second metal frames 141 and 142 may be disposed inwardly of both end surfaces 3 and 4 of the ceramic body 110 in the length direction L of the ceramic body 110 to be spaced apart from both end surfaces 3 and 4 of the ceramic body 110 by predetermined intervals, respectively.

Accordingly, first and second space parts 151 and 152 may be disposed between body parts of the first and second external electrodes 131 and 132 disposed on the first and second end surfaces 3 and 4 of the ceramic body 110 and the first and second metal frames 141 and 142, respectively.

When the multilayer ceramic capacitor 100 is mounted on the circuit board, the first and second metal frames 141 and 142 may be bonded to the circuit board by the solders, respectively, wherein the solders are accommodated in the first and second space parts 151 and 152 to avoid direct contacts between the first and second external electrodes 131 and 132 and the solders, respectively.

The first and second terminal electrodes 141 and 142 may be formed by using various conductive materials, for example, a conductive metal, a conductive resin such as a conductive epoxy, or the like, a circuit board coated with a metal, or the like. In this regard, the type of material forming the metal frames according to the present inventive concept is not particularly limited.

Meanwhile, a shape of the first and second metal frames according to the exemplary embodiment in the present inventive concept may be variously changed, as necessary. In the exemplary embodiment illustrated in FIGS. 1 and 2, the first and second metal frames 141 and 142 have an overall parallelepipedal shape.

Figure 3:
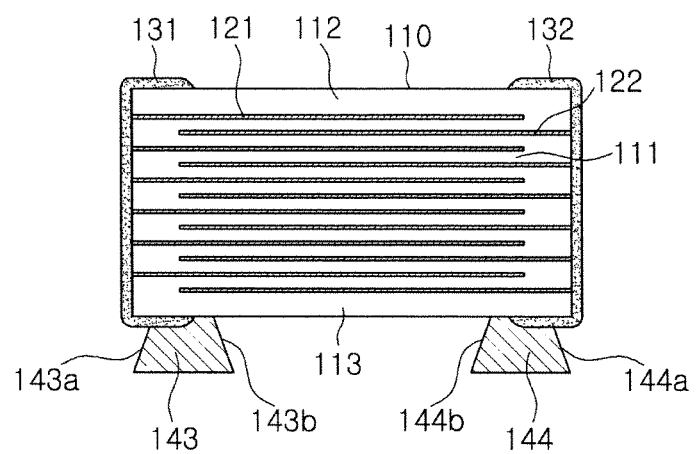
FIGS. 3 through 5 are cross-sectional views illustrating various examples of metal frames in a multilayer ceramic capacitor according to an exemplary embodiment in the present inventive concept.

In addition, as illustrated in FIG. 3, first and second metal frames 143 and 144 may be formed in a tapered shape in which left and right sides 143a, 143b, 144a, and 144b of the first and second metal frames 143 and 144 are inclined to have downwardly increasing widths of the first and second metal frames 143 and 144, respectively, so that lower surfaces of the first and second metal frames 143 and 144 bonded to the circuit board have areas greater than areas of upper surfaces the first and second metal frames 143 and 144 bonded to the first and second external electrodes 131 and 132 of the ceramic body 110, respectively.

Figure 4:
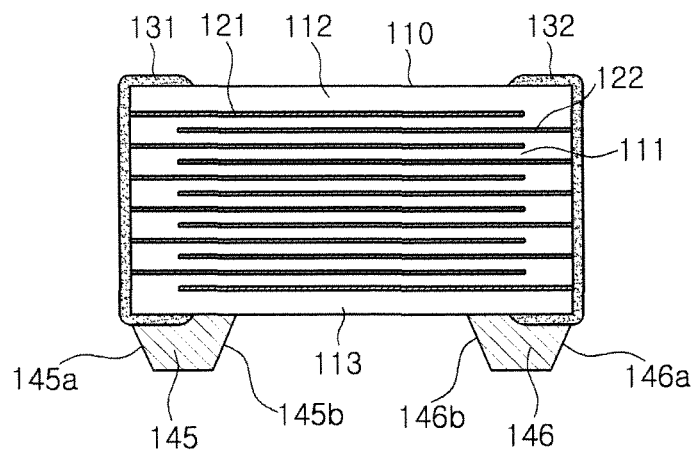

Further, as illustrated in FIG. 4, first and second metal frames 145 and 146 may be formed in a tapered shape in which left and right sides 145a, 145b, 146a, and 146b of the first and second metal frames 145 and 146 are inclined to have downwardly decreasing widths of the first and second metal frames 145 and 146, respectively, so that upper surfaces of the first and second metal frames 145 and 146 bonded to the first and second external electrodes 131 and 132 of the ceramic body 110 have areas greater than areas of lower surfaces of the first and second metal frames 145 and 146 bonded to the circuit board, respectively.

Figure 5:
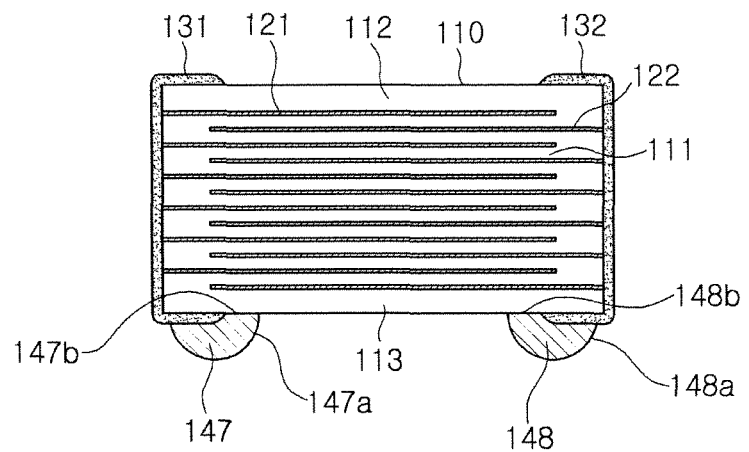

In addition, as illustrated in FIG. 5, first and second metal frames 147 and 148 may have flat upper surfaces 147b and 148b bonded to the first and second external electrodes 131 and 132 of the ceramic body 110, respectively, and may have curved lower surfaces 147a and 148a bonded to the circuit board, respectively.

Hereinafter, a relationship between a dimension of components included in the multilayer ceramic capacitor according to the present exemplary embodiment and acoustic noise will be described.

Here, it is assumed that a width of a band part of the first or second external electrode 131 or 132 is BW, a height of the first or second metal frame 141 or 142 is A, a length of the first or second metal frame 141 or 142 is C, and an interval between both end surfaces 3 or 4 of the ceramic body 110 in the length direction L of the ceramic body 110 and the first or second metal frame 141 or 142 is B.

Meanwhile, the interval B may be assumed to be an interval between an outer surface of the first or second metal frame 141 or 142 and the body part of the first or second external electrode 131 or 132.

When voltages having opposing polarities are applied to the first and second external electrodes 131 and 132 formed on first and second end surfaces 3 and 4 of the multilayer ceramic capacitor 100, respectively, in a state in which the multilayer ceramic capacitor 100 is mounted on the circuit board, the ceramic body 110 may be expanded and contracted in the thickness direction T of the ceramic body 110 due to an inverse piezoelectric effect of the dielectric layers 111, and the first and second end surfaces 3 and 4 of the ceramic body 110 having the first and second external electrodes 131 and 132 formed thereon, respectively, may be contracted and expanded in a manner contrary to the expansion and the contraction of the ceramic body 110 in the thickness direction T of the ceramic body 110 due to a Poisson effect.

When the multilayer ceramic capacitor 100 is mounted on the circuit board, the first and second metal frames 141 and 142 of the present exemplary embodiment may secure predetermined intervals between the multilayer ceramic capacitor 100 and the circuit board to avoid direct contacts between the first and second external electrodes 131 and 132 and the solders, respectively, and may directly alleviate a portion of vibrations of the multilayer ceramic capacitor 100 transferred to the circuit board through the first and second external electrodes 131 and 132, such that the amount of acoustic noise therein may be reduced.

Here, a ratio $(A \times B)/(C \times BW)$ of an area $(A \times B)$ of the first or second space part 151 or 152 in a length-thickness direction (L-T) of the first and second space parts 151 and 152 to an area $(C \times BW)$ of the band part of the first or second external electrode 131 or 132 may satisfy $0.0602 \leq (A \times B)/(C \times BW) \leq 1.8484$.

In addition, in a case in which A or B is extremely small, at the time of mounting the multilayer ceramic capacitor 100 on the circuit board, the solder moves upwards along the first or second metal frame 141 or 142 to be in direct contact with the first or second external electrode 131 or 132 of the multilayer ceramic capacitor 100, such that an effect of reducing the amount of acoustic noise therein may be deteriorated.

Experimental Example

Multilayer ceramic capacitors according to Inventive Example and Comparative Examples of the present inventive concept are manufactured as hereinbelow.

Slurry containing powder such as barium titanate (BaTiO), or the like, is applied onto a carrier film and is dried to prepare a plurality of ceramic green sheets having a thickness of 1.8 micrometers (μm).

First and second internal electrodes are formed to be alternatingly exposed through both end surfaces of the ceramic green sheet by applying a conductive paste for Ni internal electrodes onto the ceramic green sheets, using a screen.

About 370 layers of the ceramic green sheet are stacked to form a laminate, wherein ceramic green sheets in which the first and second internal electrodes are not formed are disposed above and below the ceramic green sheets in which the first and second internal electrodes 121 and 122 are formed.

The laminate formed as described above is isostatically pressed under pressure conditions of about 1,000 kilogram-force (kgf)/square centimeter (cm$^2$) and at a temperature of about 85° C.

The laminate in which the pressing process is completed is cut into individual chip forms, and the cut chips are subjected to a debinding process while maintaining a temperature at about 230° C. for about 60 hours under an air atmosphere.

The ceramic body is prepared by performing a sintering process under a reduction atmosphere having partial oxygen pressure of $10^{-11}$ standard atmospheres (atm) to $-10^{-10}$ atm which is lower than partial oxygen pressure in a state in which Ni/NiO are balanced so that the first and second internal electrodes are not oxidized at about 1,200° C.

Subsequent to the sintering process, the ceramic body has a size of 1608 obtained by length×width (L×W), that is, about 1.64 millimeters (mm)×0.88 mm.

The first and second external electrodes are formed in both end portions of the ceramic body, respectively.

The first and second metal frames are disposed on the lower surfaces of the ceramic body to be connected to the first and second external electrodes, respectively.

Here, the first and second metal frames may be positioned inwardly of both end surfaces of the ceramic body in the length direction of the ceramic body to be spaced apart from both end surfaces of the ceramic body, respectively.

Here, a manufacturing tolerance is determined to be within a range of ±0.1 mm in length×width (L×W), and when the manufacturing tolerance is satisfied, acoustic noise is measured.

TABLE 1

| Sample | A (um) | B (um) | C (um) | BW (um) | (A * B)/(C * BW) | Acoustic Noise (dBA) | Mounting NG |
|---|---|---|---|---|---|---|---|
| 1* | 63.8 | 202.1 | 1255.1 | 303.8 | 0.0338 | 47.4 | OK |
| 2* | 89.8 | 203.2 | 1257.7 | 301.2 | 0.0482 | 45.2 | OK |
| 3 | 116.1 | 201.1 | 1255.8 | 308.7 | 0.0602 | 28.7 | OK |
| 4 | 157.0 | 205.2 | 1256.5 | 303.4 | 0.0845 | 26.4 | OK |
| 5 | 208.5 | 205.5 | 1256.8 | 302.0 | 0.1129 | 26.1 | OK |
| 6 | 313.4 | 203.6 | 1258.4 | 306.9 | 0.1652 | 25.2 | OK |
| 7 | 523.6 | 206.8 | 1252.7 | 308.8 | 0.2799 | 23.2 | OK |
| 8 | 1048.6 | 199.0 | 1263.4 | 304.5 | 0.5424 | 21.3 | OK |
| 9 | 2151.6 | 201.1 | 1261.4 | 306.4 | 1.1195 | 19.4 | OK |
| 10 | 3458.7 | 208.3 | 1258.1 | 309.8 | 1.8484 | 19.3 | OK |
| 11* | 4583.5 | 201.6 | 1263.1 | 300.2 | 2.4369 | 19.2 | NG |
| 12* | 313.2 | 68.3 | 1256.1 | 302.5 | 0.0563 | 42.5 | OK |
| 13 | 317.2 | 110.7 | 1264.6 | 309.2 | 0.0898 | 22.7 | OK |
| 14 | 316.0 | 152.1 | 1259.8 | 304.7 | 0.1252 | 21.9 | OK |
| 15 | 315.3 | 213.5 | 1259.8 | 301.4 | 0.1773 | 20.4 | OK |
| 16 | 310.9 | 300.8 | 1253.2 | 305.6 | 0.2442 | 19.5 | OK |

In Table 1 above, *indicates Comparative Examples.

Data of Table 1 above represent each dimension of corresponding parts of an outer casing of the multilayer ceramic capacitors 100 manufactured as illustrated in FIG. 1.

Here, as described above, it is assumed that the width of the band part of the first or second external electrode 131 or 132 is BW, the height of the first or second metal frame 141 or 142 is A, the length of the first or second metal frame 141 or 142 is C, and an interval between both end surfaces 3 or 4 of the ceramic body 110 in the length direction L of the ceramic body 110 and the first or second metal frame 141 or 142 is B.

In order to measure acoustic noise, a single sample, for example, a multilayer ceramic capacitor, per circuit board for measuring acoustic noise is mounted on the circuit board for measuring acoustic noise while having a difference between upward and downward directions of the circuit board for measuring acoustic noise, and the circuit board for measuring acoustic noise is installed on a jig for measurement.

In addition, a direct-current (DC) voltage and a voltage fluctuation are applied to both terminals of the sample installed on the jig for measurement using a DC power supply and a function generator.

Further, acoustic noise is measured using a microphone directly installed directly on the circuit board for measuring acoustic noise.

Referring to Table 1 above, it may be appreciated that in samples 3 to 10 and samples 13 to 16 which are Inventive Examples in which the ratio (A×B)/(C×BW) of the area (A×B) of the first or second space part 151 or 152 in the length-thickness direction (L–T) to the area (C×BW) of the band part of the first or second external electrode 131 or 132 satisfies 0.0602≤(A×B)/(C×BW)≤1.8484, acoustic noise is decreased to be less than 30 dBA.

In addition, it may be appreciated that in samples 1, 2 and 12 in which (A×B)/(C×BW) is less than 0.0602 and acoustic noise is 40 dBA or more, an acoustic noise reduction effect may be relatively negligible as compared to that in Inventive Examples according to the present inventive concept.

Further, in sample 11 in which (A×B)/(C×BW) is greater than 1.8484, acoustic noise is less than 20 dBA, which is tolerable; however, mounting defects occur.

In Table 1 above, "NG" in the mounting NG indicates that a product is not properly mounted at a predetermined position due to fall-down or deviation of the product.

Board Having Multilayer Ceramic Capacitor

Figure 6:
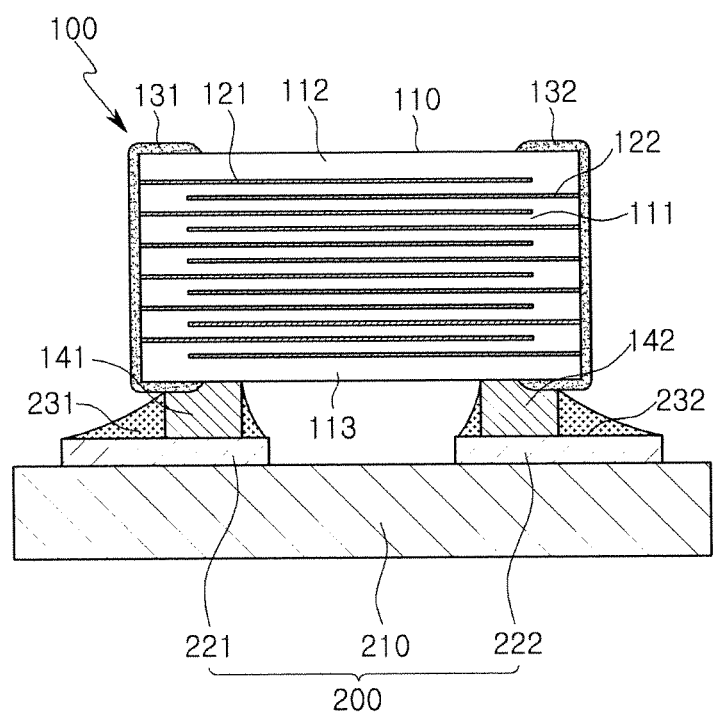
FIG. 6 is a cross-sectional view illustrating a circuit board on which a multilayer ceramic capacitor according to an exemplary embodiment in the present inventive concept is mounted.

Referring to FIG. 6, a board 200 having the multilayer ceramic capacitor 100 according to the present exemplary embodiment may include a circuit board 210 on which the multilayer ceramic capacitor 100 is horizontally mounted and first and second electrode pads 221 and 222 formed on an upper surface of the board 210 to be spaced apart from each other.

Here, the multilayer ceramic capacitor 100 may be electrically connected to the circuit board 210 by solders 231 and 232 in a state in which the first and second metal frames 141 and 142 are positioned to be in contact with the first and second electrode pads 221 and 222, respectively.

When a voltage is applied to the multilayer ceramic capacitor 100 in a state in which the multilayer ceramic capacitor 100 is mounted on the circuit board 210 as described above, acoustic noise may be generated therein.

Here, a size of the first and second electrode pads 221 and 222 may be an indicator determining an amount of the solders 231 and 232 connecting the first and second external electrodes 131 and 132 of the multilayer ceramic capacitor 100 and the first and second electrode pads 221 and 222 to each other, respectively, and an amount of the acoustic noise generated therein may be adjusted based on the amount of the solders 231 and 232.

As set forth above, according to exemplary embodiments in the present inventive concept, acoustic noise of the multilayer ceramic capacitor may be reduced by forming metal frames positioned inwardly of both end surfaces of the ceramic body in the length direction of the ceramic body to be spaced apart from both end surfaces of the ceramic body, respectively.

Various and beneficial advantages, and effects of the present inventive concept are not limited to the above-described contents, and may be more readily understood in describing specific exemplary embodiments in the present inventive concept.

While exemplary embodiments have been shown and described above, it will be apparent to those skilled in the art that modifications and variations could be made without departing from the scope of the invention as defined by the appended claims.

What is claimed is:

1. A multilayer ceramic capacitor (MLCC) comprising:

first and second metal frames formed on a mounting surface of a ceramic body to be connected to first and second external electrodes providing voltages having opposing polarities, respectively, wherein the first and second metal frames are positioned inwardly of both end surfaces of the ceramic body in a length direction of the ceramic body to be spaced apart from both end surfaces of the ceramic body, respectively, wherein the ceramic body includes a plurality of dielectric layers stacked in a thickness direction of the ceramic body, wherein the first and second external electrodes are disposed on at least the end surfaces of the ceramic body, respectively, and wherein when a width of a band part of the first or second external electrode is BW, a height of the first or second metal frame is A, a length of the first or second metal frame is C, and an interval between both end surfaces of the ceramic body in the length direction of the ceramic body and the first or second metal frame is B, $0.0602 \leq (A \times B)/(C \times BW) \leq 1.8484$ is satisfied.

2. The multilayer ceramic capacitor of claim 1, wherein the first and second metal frames have a parallelepipedal shape.

3. The multilayer ceramic capacitor of claim 1, wherein the first and second metal frames have a hexahedral shape in which a lower surface has an area greater than an area of an upper surface.

4. The multilayer ceramic capacitor of claim 1, wherein the first and second metal frames have a hexahedral shape in which an upper surface has an area greater than an area of a lower surface.

5. The multilayer ceramic capacitor of claim 1, wherein the first and second metal frames have a curved lower surface.

6. A board having a multilayer ceramic capacitor (MLCC), comprising:

a circuit board on which a plurality of electrode pads are disposed; and the multilayer ceramic capacitor of claim 1 disposed on the circuit board.

* * * * *